United States Patent
Moessner

(10) Patent No.: US 8,341,007 B2
(45) Date of Patent: Dec. 25, 2012

(54) SYSTEMS AND METHODS FOR FORECASTING DEMAND OF AN OBJECT IN A MANAGED SUPPLY CHAIN

(75) Inventor: Ralph Moessner, Pfinztal (DE)

(73) Assignee: SAP AG, Walldorf (DE)

( * ) Notice: Subject to any disclaimer, the term of this patent is extended or adjusted under 35 U.S.C. 154(b) by 1512 days.

(21) Appl. No.: 11/017,764

(22) Filed: Dec. 22, 2004

(65) Prior Publication Data

US 2005/0165635 A1    Jul. 28, 2005

(30) Foreign Application Priority Data

Dec. 30, 2003    (EP) .................................... 03079199

(51) Int. Cl.
*G06Q 10/00*    (2006.01)
(52) U.S. Cl. ...................................... 705/7.31
(58) Field of Classification Search ................. 705/7–10
See application file for complete search history.

(56) References Cited

U.S. PATENT DOCUMENTS

| | | | | |
|---|---|---|---|---|
| 5,712,985 A * | 1/1998 | Lee et al. ...................... | 705/7.31 |
| 5,893,069 A * | 4/1999 | White, Jr. ...................... | 705/348 |
| 6,581,008 B2 * | 6/2003 | Intriligator et al. ............... | 702/3 |
| 6,611,726 B1 * | 8/2003 | Crosswhite ...................... | 700/99 |
| 7,080,026 B2 * | 7/2006 | Singh et al. ................... | 705/7.31 |
| 7,236,940 B2 * | 6/2007 | Chappel ........................ | 705/7.31 |
| 7,379,890 B2 * | 5/2008 | Myr et al. ..................... | 705/7.35 |
| 7,383,201 B2 * | 6/2008 | Matsuzaki et al. ........... | 705/7.25 |
| 7,516,096 B1 * | 4/2009 | Hsu .............................. | 705/36 R |
| 7,584,116 B2 * | 9/2009 | Kakouros et al. ............. | 705/7.31 |
| 7,634,423 B2 * | 12/2009 | Brocklebank ................ | 705/7.29 |
| 8,000,994 B2 * | 8/2011 | Brocklebank ................ | 705/7.31 |
| 2003/0200134 A1 * | 10/2003 | Leonard et al. ................. | 705/10 |
| 2005/0096963 A1 * | 5/2005 | Myr et al. ....................... | 705/10 |
| 2005/0102175 A1 * | 5/2005 | Dudat et al. .................... | 705/10 |

OTHER PUBLICATIONS

Leonard, Michael, "Promotional Analysis and Forecasting for Demand Planning: A Practical Time Series Approach", with exhibit 2, SAS Institute Inc., Cary, North Carolina, 2000, 22 pp. last accessed from: http://web.archive.org/web/*/http://support.sas.com/rnd/app/papers/PromotionalAnalysisExhibit2.pdf.*

(Continued)

*Primary Examiner* — Andre Boyce
*Assistant Examiner* — Tiphany Dickerson
(74) *Attorney, Agent, or Firm* — Finnegan, Henderson, Farabow, Garrett & Dunner LLP

(57) ABSTRACT

Systems and methods are disclosed for forecasting demand for objects, such as products, parts, etc. in a managed supply chain. In one embodiment, a method for forecasting demand is provided that comprises the step of determining a forecast profile including a forecast model and a forecast parameter to be assigned to a set of data forming the basis of the forecast. The determining step may include the steps of performing at least one forecast test on the set of data to identify the significance of a forecast model in the set of data, and determining iteratively the value of a forecast parameter, wherein the forecast parameter is determined based on the outcome of performing the at least one forecasting test. Further, the method may include the step of automatically assigning the determined forecast profile to the set of data.

13 Claims, 3 Drawing Sheets

OTHER PUBLICATIONS

Kjell Vaage, Detection of outliers and level shifts in time series: An Evaluation of Two Alternative Procedures, Jan 2000, Journal of Forecasting; 19, 1; ABI/INFORM Global p. 23-37.*

Leonard, Michael, "Promotional Analysis and Forecasting for Demand Planning: A Practical Time Series Approach", with exhibit 2, SAS Institute Inc., Cary, North Carolina, 2000, 22 pp. last accessed from: http://web.archive.org/web/*/http://support.sas.com/rnd/app/papers/PromotionalAnalysisExhibit2.pdf.*

Forecasting Using Eviews 2.0: An Overview, last accessed from: http://faculty.washington.edu/ezivot/introforecast.PDF.*

Kjell Vaage, Detection of outliers and level shifts in time series: An Evaluation of Two Alternative Procedures, Jan. 2000, Journal of Forecasting; 19, 1; ABI/INFORM Global p. 23-37.*

Adya. M., et al., Automatic Identification of Time Series Features for Rule-Based Forecasting (2001) International Journal of Forecasting pp. 143-157.*

Tashman, L., "Automatic Forecasting Software: A Survey and Evaluation" (1999), Reprinted from International Journal of Forecasting, pp. 209-230.*

* cited by examiner

Figures 1(a)-(d)

SYSTEMS AND METHODS FOR FORECASTING DEMAND OF AN OBJECT IN A MANAGED SUPPLY CHAIN

BACKGROUND OF THE INVENTION

I. Field of the Invention

The present invention generally relates to computerized forecasting systems and methods. More particularly, the invention relates to systems and methods for forecasting demand for an object in a managed supply chain.

II. Background Information

Forecasting predicts future demand for a product based on historical and judgmental data. Forecasts can be created in various ways. For example, forecasts may be created by, for example, statistical methods, causal analysis, human judgment or a combination of these approaches.

Forecasting techniques employing a degree of automation are also known. For instance, one or more aspects of a forecasting procedure may be carried out automatically using, for example, a computer.

It has been found, however, that when a partially, automated forecast process is performed one or more problems can arise. For instance, when performing a partially, automated forecast based on historical data, which may include a time varying historical time series, manual intervention is often required in order to generate the forecast. In particular, manual intervention may be required in order to select the most suitable forecast model(s) and/or parameter(s) for such a forecast model.

In view of the foregoing, it is an object of the present invention to address these and/or other problems encountered in conventional demand forecasting. In particular, it is an object of the present invention to reduce the need for manual intervention in forecasting demand.

SUMMARY OF THE INVENTION

Consistent with embodiments of the present invention, computerized systems and methods are disclosed for forecasting demand for an object, such as a product, part, etc., in a managed supply chain.

According to one embodiment, a method is provided for forecasting demand for an object in a managed supply chain. As disclosed herein, the method may comprise the step of determining a forecast profile including a forecast model and a forecast parameter to be assigned to a set of data forming the basis of the forecast. The determining step may include the steps of: performing at least one forecast test on the set of data to identify the significance of a forecast model in the set of data; and determining, iteratively, the value of a forecast parameter, wherein the forecast parameter is determined based on the outcome of performing the at least one forecast test. The method may also include the further step of assigning the determined forecast profile to the set of data. In this way, the optimal model may be automatically searched for and selected. Further, all parameters may be identified without requiring manual intervention.

According to a further embodiment of the present invention, there is provided a demand forecasting apparatus for forecasting demand for an object in a managed supply chain, wherein the demand forecasting apparatus is operatively associated with a user interface for receiving input of a forecast selection. The demand forecasting may comprise a storage medium having recorded therein processor readable code processable to forecast demand for an object in a managed supply chain. The code may comprise determining code processable to determine a forecast profile including a forecast model and a forecast parameter to be assigned to a set of data forming the basis of the forecast, the determining code including performing code processable to perform at least one forecast test on the set of data to identify the significance of a forecast model in the set of data. The code of the demand forecasting apparatus may also comprise determining code processable to determine iteratively a value of a forecast parameter, wherein the forecast parameter is determined based on performing the at least forecast test. Further, the processor readable code may comprise assigning code processable to assign the determined forecast profile to the set of data.

According to another embodiment of the present invention, there is provided a user terminal comprising means operable to perform one or more steps of methods consistent with the present invention.

In accordance with yet a further embodiment of the present invention, there is provided a program storage device readable by a processing apparatus or processor, the device embodying a program or set of instructions executable by the processor to perform one or more steps of methods consistent with the present invention.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this disclosure, illustrate various embodiments and aspects consistent with the present invention. In the drawings:

FIG. 1$b$ illustrates an example of trend forecast model;

FIG. 1$c$ illustrates an example of seasonal forecast model;

FIG. 1$d$ illustrates an example of seasonal trend forecast model;

DETAILED DESCRIPTION

Figure 1:
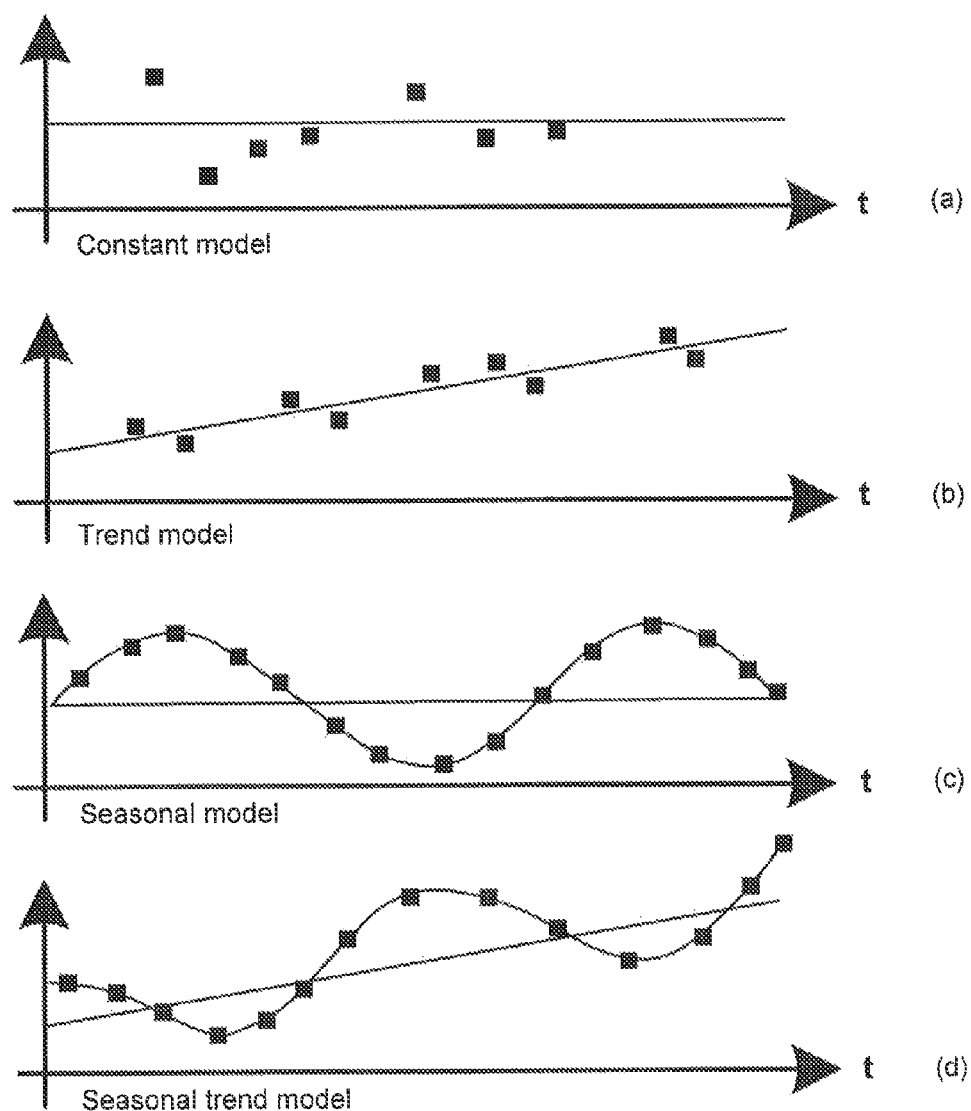
FIG. 1$a$ illustrates an example of a constant forecast model.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering or adding steps to the disclosed methods. Accordingly, the following detailed description does not limit the invention. Instead, the proper scope of the invention is defined by the appended claims.

Data used in forecasting models typically include consumption values. When a series of consumption values is analyzed, it typically reveals one or more patterns. These patterns can then be matched-up with a forecast model.

Embodiments of the invention have application to various types of forecast models. A non-exhaustive list of such forecast models is provided below. It will be understood, however, that embodiments of the present invention may be implemented in relation to other forecast models, some of which are mentioned later in the text.

Examples of forecast models include: constant models where consumption values vary very little from a table mean value; trend models where consumption values fall or rise substantially constantly over a relatively long period of time with only occasional deviations; seasonal models where a periodically recurring peak or low values differ significantly from a stable mean value; seasonal trend models where there is a substantially continual increase or decrease in the mean value; and copies of actual data models. In a copy of an actual data model, no forecast is executed. Instead, the historical data updated from the operative application is copied, which can then be edited. If no pattern can be detected in a series of historical consumption values, for example, by performing for example a white noise test as described below, the time series may be regarded as irregular.

FIGS. 1a-1d illustrate examples of constant, trend, seasonal and seasonal trend forecast models, respectively. In these figures, the consumption values are plotted against time. Mathematically speaking, the seasonal trend is the most complex of those models shown. For example, for the seasonal trend model, the forecast value comprises a basic value term G from the constant model, a trend term T from the trend model, and a seasonal term S from the seasonal model.

A forecast profile includes a forecast model, as described above, and forecast parameters which take a value and which are applied to the model. Typically, each model includes certain forecast parameters to which a value is to be assigned in order for the model to provide an optimum forecast. Model initialization is the process of determining the necessary model parameters, for example, the basic value, the trend value and the seasonal indices, for the selected forecast model. The forecast parameters may also include smoothing parameters, such as alpha, beta and gamma parameters.

In one embodiment, it is desirable that when a model is used, forecasts of a value of one period are based on the forecast value for the period directly before it.

An initial value may be provided as input to start a forecast. By way of example, Table 1 shows model parameters that may be associated with each forecast model.

TABLE 1

| MODEL | MODEL PARAMETERS |
| --- | --- |
| Constant model | Basic value |
| Trend model | Basic value, trend value |
| Seasonal model | Basic value, seasonal indices |
| Seasonal Trend model | Basic value, trend value, seasonal indices |

Figure 2:
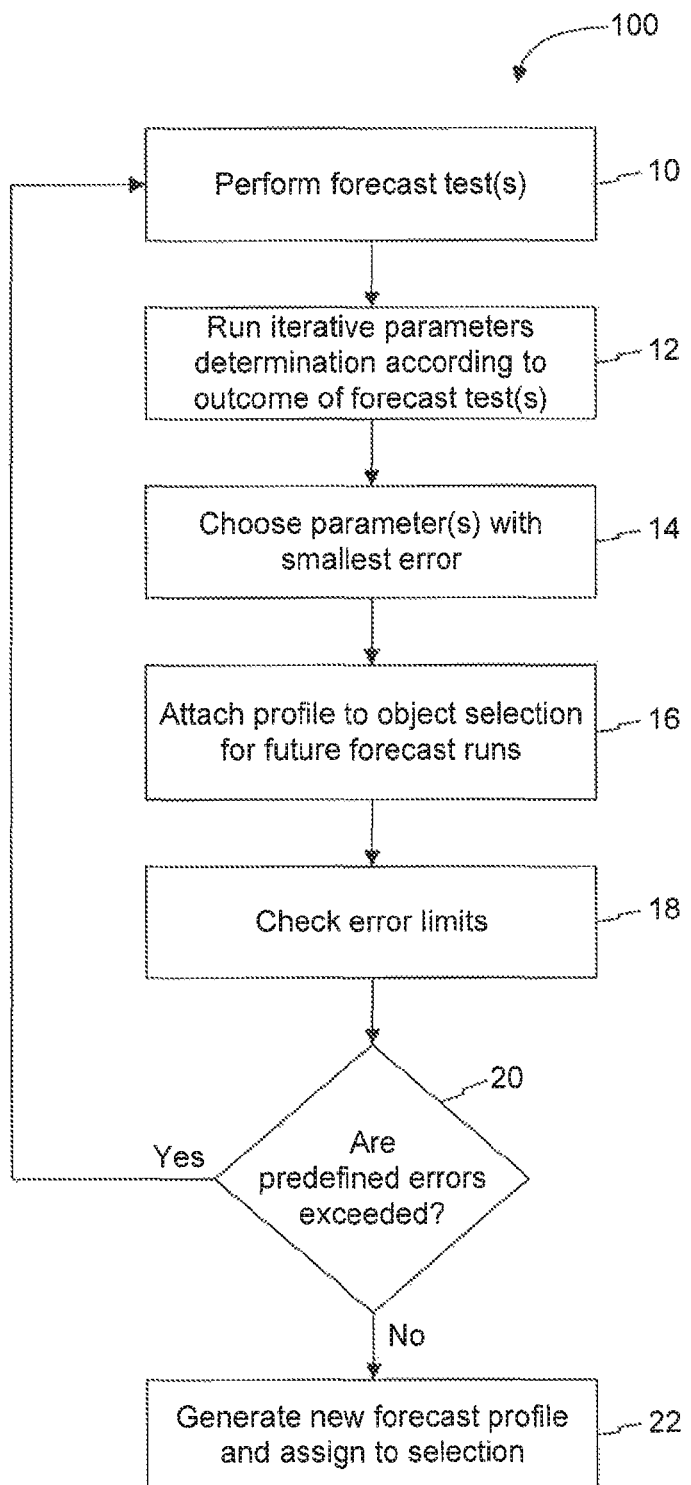
FIG. 2 is a flow chart of an exemplary method for forecasting demand, in accordance with an embodiment of the present invention.

FIG. 2 shows a flow chart of an exemplary method for forecasting demand, in accordance with an embodiment of the present invention. As can be seen, an exemplary process 100 is shown that includes the step of performing one or more forecast tests (step 10). A forecast test may be carried out on the set of data forming the basis of the analysis. The user may make a selection with respect to a certain object or objects for which the forecast is to be made. However, this is not essential. Embodiments of the invention have application to batch processing and may be applied to either an entire data range or portions thereof.

In one embodiment, a forecast test includes a test to identify the significance of a forecast model or models in the set of data. For example, forecast tests may include tests to identify whether the set of data exhibits seasonal, trend, croston or white noise model associated characteristics. The optimum forecast model may be identified in this way according to which test the set of data returns the greatest significance indication. A test or a plurality of tests may be carried out. In one embodiment, a seasonal and/or trend test is carried out first. Depending on the results of these tests, systems consistent with the invention may decide to use a constant, trend, a seasonal, or a trend seasonal model, etc. with those parameters specified by each model, respectively.

It is noted that the croston model is known in the art, and functions by identifying which percentage of the historical data has value zero. It is good for modeling sporadic behavior. The croston model may be applied if the percentage of zeros is above a certain predetermined threshold value.

A white noise test may be performed in order to detect if the time series is irregular. In one embodiment, if the set of data tests positive for the white noise text, the constant model is generally applied.

Returning to FIG. 2, after the forecast test(s) has/have been applied, an iterative parameter determination may be performed according to the outcome of the forecast test(s) (step 12). That is, the parameter iteration is performed for the forecast models for which a significance was identified in the test. A positive test for a particular test indicates that the set of data fits the model. The significance indicates that the set of data fits the model to a sufficient degree. For example, if the forecast tests establish that a seasonal model fits the set of data, only those parameters associated with the seasonal model are determined in the iterative determination. This results in a more automated procedure to find the optimum forecast model and parameter combination for a certain set of data, which may represent for example a certain characteristic value combination. Further, the model selection may be processed quicker than in conventional forecast methods, because of the reduced number of iteration steps required subsequent to carrying out the forecast test(s). This represents a more efficient use of processing power in a computerized system.

In one embodiment, the parameter iteration step varies the parameters alpha, beta and gamma between, for example, the values 0.1 and 0.5 with incremental steps of 0.1. The step width and the starting and end values may be customized by the user. If the user does not choose this option, then default values of the iteration for parameters, for example, alpha, beta and gamma, may be chosen. Further, in order to increase the flexibility of the forecasting with respect to conventional methods, these parameters may be included in the forecast profile.

Consistent with embodiments of the invention, the forecast result which is estimated to be the optimum is the one which results in the lowest forecast error. Accordingly, the system may choose the model and parameter set with the smallest error (step 14). The forecast profile defines the error to be used. This may be set by the system or by a user. For example, the following error determinations may be chosen: mean absolute deviation (MAD), mean squared error (MSE), root of mean squared error (RMSE), mean percentage error (MPE), means absolute percentage error (MAPE), error total, or any further user-defined error measure.

If the result of the forecast test(s) is negative with respect to significance, the system may apply the constant model to the data or to a forecast test which provided a positive significance results with respect to a related set of data. The forecast tests, in particular, the seasonal and trend tests, may be defined in the system. However, a user may be permitted to define that a negative trend is to be treated as no trend and, as a result, a constant model will be chosen. Thus, the user may define how the results of the tests will influence the model selected.

Once the parameters have been determined, the forecast profile is attached to the set of data which may represent an object selection for future forecast runs (step 16). Conventionally, there is no automatic procedure of assigning forecast profiles to selections. According to embodiments of the present invention, such functionality may be provided. For example, during a batch forecasting run with an iterative determination of parameters, the system may dynamically create a forecast profile with parameters of the forecast strategy chosen. After that, the system may assign these generated profiles to the selection. By way of example, this feature may be activated by a flag in the activity for batch jobs.

Having assigned the profile, the system may check for one or more error limits (step 18). If it is determined that predefined errors are exceeded (step 20; "Yes"), then the system may send an alert and, if necessary, a forecast model selection may be carried out again, with further iterative determination of parameters being carried out. Also, if the error measure of a batch forecast exceeds the error limits defined in a diagnosis group of the forecast profile, an alert may be sent. If it is determined that the result does not exceed the error limits (step 20; "No"), then a new forecast profile may be generated and assigned to the selection and no alert may be sent (step 22).

As mentioned, the forecast resulting in a minimum forecast error may be chosen as the best result. The optimal parameter value or set of parameter values, depending on the model, may be attached to the selection of forecasted objects, represented by the set of data. This ensures that in a future forecast run, the optimal parameters can be chosen directly. When such a parameter set is attached to an object selection, the forecast may be carried out with this parameter or parameter set. Afterwards, the forecast result may be analyzed using predefined error limits which are part of the attached parameter set. If the forecast exceeds the predefined error limits, the automatic model selection may be started again (see FIG. 2, where step 20 returns to step 10), which searches for better parameter sets This can ensure an automated process with minimum user interference and optimal forecast results.

According to an embodiment of the present invention, there is provided a method for forecasting demand for a object in a managed supply chain. The method may comprise the step of determining a forecast profile including a forecast model and a forecast parameter to be assigned to a set of data forming the basis of the forecast, wherein the determining step includes the steps of performing a forecast test on the set of data to identify the significance of a forecast model in the set of data and determining iteratively the value of a forecast parameter, wherein the forecast parameter is determined based on the outcome of the performing step. Further, the method may include the step of assigning the determined forecast profile to the set of data. In this way, user interference is minimized, while optimum forecast parameters are found with an increase in efficient use of the system's processing power.

In a further embodiment, the assigning step is carried out automatically. In this way, the profile is assigned without requiring user input.

In a further embodiment, the set of data represents a user selection with respect to an object or group of objects. In this way, the user can select which object or objects are to be the subject of the forecast. Alternatively, a data set may include all objects.

In still a further embodiment, the performing step includes the step of performing a plurality of forecast tests to identify the significance of a plurality of forecast models, respectively. In one embodiment, the seasonal test and the trend test may be carried out. In this way, it can be determined which of a plurality of tests the set of data tests positively for with respect to significance, thus increasing the chances of identifying the optimum model.

In accordance with another embodiment, the values of a plurality of forecast parameters are determined iteratively. Depending on the model identified, one or more parameters may be determined. By determining the plurality of parameters, optimal use of the model can be achieved.

A further embodiment includes the step of determining a forecast error for the forecast parameter(s). Also, in a further embodiment, the method may include the step of choosing the forecast parameter for the forecast profile on the basis of the forecast error determination. In this way, the optimum value for each parameter can be obtained.

In another embodiment, the assigning step is carried out for future forecast runs. In this way, data processing is saved, since it is not necessary to carry out a complete model selection for future forecast runs, as the results of the present run are assigned to a future run.

In still a further embodiment, the method includes the steps of determining the forecast errors in a future forecast run and determining whether a predetermined error limit is exceeded. In this way, rather than carrying out a model selection and parameter determination for every future run, if a future run includes a set of data which does fits a present profile, no new model selection is carried out. Thus, it is only carried out where necessary, further saving on processing capacity.

Figure 3:
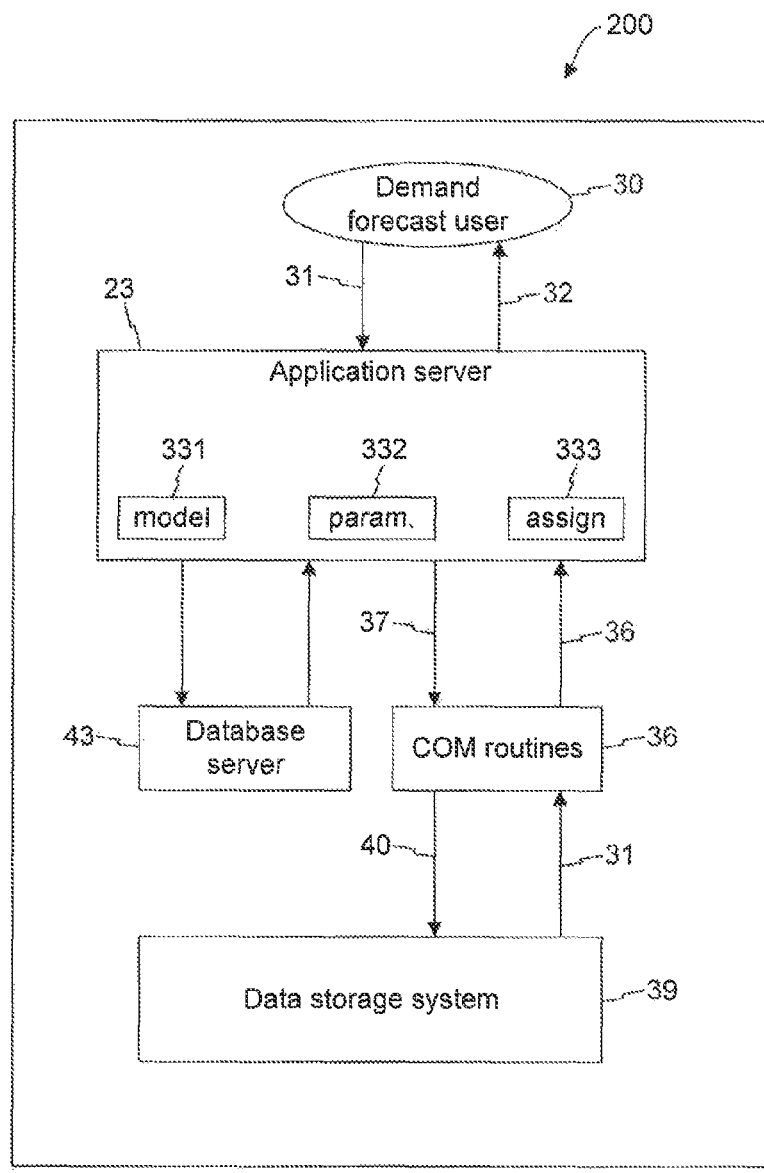
FIG. 3 is an exemplary system architecture, in accordance with an embodiment of the present invention.

FIG. 3 shows an exemplary system architecture, in accordance with an embodiment of the present invention. In particular, a system 200 is shown in which one or more steps of methods consistent with the present invention may be implemented, including the data flow and data processing steps initiated by a demand forecasting apparatus or method consistent with the invention As shown in FIG. 3, the system 200 includes a demand forecast user 30, which may comprise a graphic user interface (GUI) with which a user interacts. The user may make a request or input data 31 to an application server 33. The input may include, for example, a selection of a set of data already stored or a set of data on which a forecast is to be based. In one embodiment, the user may input a first initial value and changed values, if and when desired. Having provided data and/a request, the user may receive an output in the form of a delivery of data 32 from the application server 33. The application server 33 may run the application logic which carries out the demand forecasting.

The system 200 may further include a programming system 36 for running Common Object Model (COM) routines and defining a network programming system. The COM routines may receive a request or an input of data 37 from the application server 33. Furthermore, the COM routines may deliver data 38 to the application server 33. In one embodiment, the function of the COM routines is to carry out data transformation and data calculation.

As illustrated in FIG. 3, the COM routines may be further in association with a data storage system 39, such as an object-oriented database, for example, a LiveCache. The COM routines may send a request or an input of data 40 to the data storage system 30. The data storage system 39 may deliver data 41 to the COM routines.

Returning to the application server 33 and the example of FIG. 3, in one embodiment of the present invention, a demand forecasting apparatus is provided for forecasting demand for an object in a managed supply chain, wherein the demand forecasting apparatus is operatively associated with a user interface for receiving input of a forecast selection. The demand forecasting apparatus may comprise a storage medium having recorded therein processor readable code processable to forecast demand for an object in a managed supply chain. The code may comprise determining code processable to determine a forecast profile including a forecast model and a forecast parameter to be assigned to a set of data forming the basis of the forecast, the determining code including a performing code processable to perform a forecast test on the set of data to identify the significance of a forecast model in the set of data. The code may also comprise determining code processable to determine iteratively a value of a forecast parameter, wherein the forecast parameter is determined by the performing code, and assigning code processable to assign the determined forecast profile to the set of data.

In one embodiment, the application logic is written in Advanced Business Application Programming (ABAP), a programming language developed by SAP AG (Walldorf, Germany) for application development. However, embodiments of the invention are not limited in this respect and other programming languages are also suitable depending on the particular application embodiments of the present invention are incorporated into.

Referring again to the example of FIG. 3, the application server 33 may comprise a plurality of applications 331, 332, 333, adapted to carry out data processing. The first application 331 may be adapted to perform model selection, as described above. The second application 332 may be adapted to carry out the iterative determination of the parameter values, as described above. The third application 333 may be adapted to carry out the assignment of the forecast profile to the set of data.

The application server 33 may also include means to perform the requested processing that is provided as input by the demand forecasting user 30. At the request processing level, the user request is processed without processing the actual data. In one embodiment, the applications 331, 332, 333 are adapted to carry out the data processing.

It will be understood that depending on the other applications comprised in the system 200, the system may include a plurality of GUIs and/or applications. Further, while only one GUI and application are shown in FIG. 3, other GUIs and/or applications may also be comprised in the system.

In demand forecasting, the internal logic for dealing with transactional data may incorporate the following: the transactional data are stored in a data storage system 39, for example, an object-oriented data storage system, such as LiveCache (LC). Further, the transactional data may be represented with three technical characteristics for profile, table, and row.

Embodiments of the invention as described can be implemented in digital electronic circuitry, or in computer hardware, firmware, software, or in any combination thereof. Systems and apparatus consistent with the present invention can be implemented in a computer program product tangibly embodied in a machine readable storage device for execution by a programmable processor. Further, method steps consistent with the invention can be performed by a programmable processor executing a program or set of instructions to perform functions of the invention by operating on input data and generating output. Embodiments of the invention can also be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language.

Suitable processors include, by way of example, both general and special purpose microprocessors. Typically, a processor will receive instructions and data from a read-only memory and/or a random access memory. Further, a computer may include one or more mass storage devices for storing data files. Such devices include magnetic disks, such as internal hard disks and removable disks; magneto-optical disks, as well as optical disks. Storage devices suitable for tangibly embodying computer program instructions and data include all forms of non-volatile memory, including by way of example, semiconductor memory devices, such as EEPROM, and flash memory devices; magnetic disks such as internal hard disks and removable disks; magneto-optical disks; and CD-ROM disks. Any of the foregoing can be supplemented by, or incorporated in ASICs (application specific integrated circuits).

To provide for interaction with a user, embodiments of the invention can be implemented on a computer system having a display device, such as a monitor or LCD screen for displaying information to the user, and a keyboard and a pointing device, such as a mouse or a trackball by which the user can provide input to the computer system. The computer system can be programmed to provide a graphical user interface through which computer programs interact with users.

While certain features and embodiments of the invention have been described, other embodiments of the invention will be apparent to those skilled in the art from consideration of the specification and practice of the embodiments of the invention disclosed herein. For example, in the embodiments described certain products, characteristics and other parameters are referred to. The present invention is not limited to these particular products, characteristics or other parameters, and these are given by way of example only. Further, the present invention has broad application to the demand planning of any product, including configurable products. Moreover, although embodiments of the invention have been described as being associated with data stored in memory and other storage mediums, one skilled in the art will appreciate that these aspects can also be stored on or read from other types of computer-readable media, such as secondary storage devices, like hard disks, floppy disks, or a CD-ROM, a carrier wave from the Internet, or other forms of RAM or ROM. Further, the steps of the disclosed methods may be modified in any manner, including by reordering steps and/or inserting or deleting steps, without departing from the principles of the invention.

It is intended, therefore, that the specification and examples be considered as exemplary only, with a true scope and spirit of the invention being indicated by the following claims and their full scope of equivalents.

What is claimed is:

1. A computer-implemented method for forecasting demand for an object in a managed supply chain, the computer-implemented method comprising:
performing, by a computer processor, at least one forecast test on a first set of data representative of consumption of the object in the managed supply chain to identify significance levels of a plurality of forecast models to the consumption data;
selecting, by the computer processor, at least one of the forecast models based on the significance levels;
iteratively determining, by the computer processor, optimal forecast parameters correspondingly associated with the selected forecast models to identify an optimal combination of one of the selected forecast models and its corresponding forecast parameters, wherein the optimal combination yields a lowest forecast error;
creating, by the computer processor, an optimal forecast profile comprising the optimal forecast model and the forecast parameters, the forecast parameters including the lowest forecast error as a predefined forecast error limit;
assigning, by the computer processor, the optimal forecast profile to the object; and
starting a forecast of the consumption of the object in accordance with the optimal forecast profile associated with the object;
generating, by the computer processor, based on the optimal forecast profile, a forecast associated with a second set of data representing the consumption of the object in the managed supply chain, in response to receiving the second set of data;
determining, by the computer processor, a forecast error for the forecast;
accepting, by the computer processor, the forecast when the forecast error is within the predefined forecast error limit; and
when the forecast error exceeds the predefined forecast error limit, automatically reselecting a different forecast model and different forecast parameters.

2. The computer-implemented method of claim 1, wherein assigning the optimal forecast profile is performed automatically.

3. The computer-implemented method of claim 1, wherein the first set of data is determined based on a user selection with respect to the object or group of objects.

4. The computer-implemented method of claim 1, wherein the forecast parameters include at least one smoothing parameter.

5. The computer-implemented method of claim 1, wherein assigning the optimal forecast profile comprises assigning the optimal forecast profile for the future forecast runs.

6. The computer-implemented method of claim 1, wherein the forecast models comprise a seasonal model, a trend model, a croston model; and a white noise model.

7. The computer-implemented method of claim 6, wherein the croston model is selected when percentage of zeros in the consumption data is above a predetermined threshold value.

8. The computer-implemented method of claim 1, further comprising performing a white noise test on the first set of data to detect whether the first set of data is irregular.

9. The computer-implemented method of claim 1, further comprising receiving a start value, an end value, and a step width of the corresponding forecast parameters from a user.

10. A computer-readable storage medium storing a program for causing a computer to perform a method for forecasting demand, the method comprising:
performing at least one forecast test on a first set of data representative of consumption of an object in a managed supply chain to identify significance levels of a plurality of forecast models to the consumption data;
selecting at least one of the forecast models based on the significance levels;
iteratively determining optimal forecast parameters correspondingly associated with the selected forecast models to identify an optimal combination of one of the selected forecast models and its corresponding forecast parameters, wherein the optimal combination yields a lowest forecast error;
creating an optimal forecast profile comprising the optimal forecast model and the forecast parameters, the forecast parameters including the lowest forecast error as a predefined forecast error limit;
assigning the optimal forecast profile to the object; and
starting a forecast of the consumption of the object in accordance with the optimal forecast profile associated with the object;
generating, based on the optimal forecast profile, a forecast associated with a second set of data representing the consumption of the object in the managed supply chain, in response to receiving the second set of data;
determining a forecast error for the forecast;
accepting the forecast when the forecast error is within the predefined forecast error limit; and
when the forecast error exceeds the predefined forecast error limit, automatically reselecting a different forecast model and forecast parameters.

11. The computer-readable storage medium of claim 10, wherein assigning the optimal forecast profile is performed automatically.

12. The computer-readable storage medium of claim 10, wherein the first set of data is determined based on a user selection with respect to the object or group of objects.

13. A computer system for forecasting demand for an object, the system comprising:
means for performing at least one forecast test on a first set of data representative of consumption of the object in a managed supply chain to identify significance levels of a plurality of forecast models to the consumption data;
means for selecting at least one of the forecast models based on the significance levels;
means for iteratively determining optimal forecast parameters correspondingly associated with the selected forecast models to identify an optimal combination of one of the selected forecast models and its corresponding forecast parameters, wherein the optimal combination yields a lowest forecast error;
means for creating an optimal forecast profile comprising the optimal forecast model and the forecast parameters, the forecast parameters including the lowest forecast error as a predefined forecast error limit;
means for assigning the optimal forecast profile to the object; and
means for starting a forecast of the consumption of the object in accordance with the optimal forecast profile associated with the object;
means for receiving a second set of data representing the consumption of the object in the supply chain;
means for generating a forecast associated with the second set of data based on the optimal forecast profile;
means for determining a forecast error for the forecast;
means for accepting the forecast when the forecast error is within the predefined forecast error limit; and
means for, when the forecast error exceeds the predefined forecast error limit, automatically reselecting a different forecast model and forecast parameters.

* * * * *